(12) United States Patent
Feldman

(10) Patent No.: US 11,044,917 B1
(45) Date of Patent: Jun. 29, 2021

(54) APPARATUS AND METHOD FOR A CONTINUOUS CHEESE ROPE DEPOSITOR

(71) Applicant: Scott Feldman, Canton, MA (US)

(72) Inventor: Scott Feldman, Canton, MA (US)

(73) Assignee: ROBERT REISER & Co, Inc., Canton, MA (US)

(*) Notice: Subject to any disclaimer, the term of this patent is extended or adjusted under 35 U.S.C. 154(b) by 12 days.

(21) Appl. No.: 16/246,664

(22) Filed: Jan. 14, 2019

(51) Int. Cl.
| | |
|---|---|
| *A21C 9/04* | (2006.01) |
| *A21D 13/22* | (2017.01) |
| *A21D 13/41* | (2017.01) |
| *A21C 11/02* | (2006.01) |
| *A23P 30/20* | (2016.01) |
| *A21C 11/00* | (2006.01) |
| *A23P 20/25* | (2016.01) |
| *A21C 9/08* | (2006.01) |
| *A21D 8/02* | (2006.01) |

(52) U.S. Cl.
CPC ............... *A21C 9/04* (2013.01); *A21C 9/085* (2013.01); *A21C 11/004* (2013.01); *A21C 11/02* (2013.01); *A21D 8/02* (2013.01); *A21D 13/22* (2017.01); *A21D 13/41* (2017.01); *A23P 20/25* (2016.08); *A23P 30/20* (2016.08)

(58) Field of Classification Search
CPC .. A21C 9/04–9/045; A21C 9/08; A21C 9/085; A21C 11/004–11/08; A21C 14/00; A21C 15/002–15/005; A21C 11/02–08; A21D 8/02; A21D 13/13; A21D 13/22; A21D 13/41; A23P 20/10; A23P 30/20; A23P 2020/253; A23P 20/25; B29C 48/266; B29C 48/301; B29C 48/355

USPC ......... 426/104, 138, 282–283, 512, 515–517
See application file for complete search history.

(56) References Cited

U.S. PATENT DOCUMENTS

| | | | | |
|---|---|---|---|---|
| 2,478,199 | A * | 8/1949 | Lyon .................. | B29C 48/03 264/294 |
| 2,742,000 | A * | 4/1956 | Hansen .............. | A23G 3/28 425/375 |
| 3,648,596 | A * | 3/1972 | Zito ................... | A21C 9/04 118/31 |
| 3,677,769 | A * | 7/1972 | King .................. | A21D 13/41 426/27 |

(Continued)

OTHER PUBLICATIONS

RD 417040A, Michael Gilardi, Mark Chaplin, Mitch Barhorst, Stuffed Crust Pizza Process, published Jan. 1999. (Year: 1999).*

*Primary Examiner* — Drew E Becker
(74) *Attorney, Agent, or Firm* — Richard A. Joel

(57) ABSTRACT

This invention relates to a method and apparatus for forming a stuffed crust pizza on a continuous high speed basis. The invention can form and deposit a cheese rope in either an ellipse or circular shape, onto a moving sheet of dough with multiple lanes using a waterwheel flow divider. An encoder is mounted to the conveyor feeding the dough to the apparatus. This provides both position information and speed of the dough to a motion controller to guide the movement of the nozzles. A stamping device initially presses an indentation of the cheese shape into the dough sheet and provides a natural resting location for the cheese to be deposited. A set of two nozzles per lane is utilized to form the cross sectional shape of the cheese. Each nozzle forms one half of the total shape of the cheese and the flow to each nozzle is controlled by a waterwheel flow divider.

9 Claims, 3 Drawing Sheets

(56) References Cited

U.S. PATENT DOCUMENTS

| | | | | |
|---|---|---|---|---|
| 3,685,744 A * | 8/1972 | Ludy, Jr. | A21C 9/04 | 239/552 |
| 3,908,584 A * | 9/1975 | Raque | A21C 9/04 | 118/682 |
| 3,926,146 A * | 12/1975 | Breyer | A21C 9/04 | 118/24 |
| 3,940,226 A * | 2/1976 | Verhoeven | A21C 11/16 | 425/375 |
| 4,145,990 A * | 3/1979 | Hochandel | A21C 9/04 | 118/25 |
| 4,152,976 A * | 5/1979 | Kawasaki | A21C 9/04 | 177/120 |
| 4,248,173 A * | 2/1981 | Kuhlman | A21C 9/04 | 118/20 |
| 4,478,569 A * | 10/1984 | Giulio | A21C 3/08 | 425/324.1 |
| 4,536,147 A * | 8/1985 | Groff | A21C 3/08 | 425/146 |
| 4,566,506 A * | 1/1986 | Cramer | B65D 83/00 | 118/25 |
| 4,634,365 A * | 1/1987 | Triporo | A21C 11/006 | 425/398 |
| 4,923,706 A * | 5/1990 | Binley | A23G 9/228 | 264/177.11 |
| 5,318,629 A * | 6/1994 | Raque | A21C 15/002 | 118/102 |
| 5,445,674 A * | 8/1995 | DeMars | A21C 9/04 | 118/25 |
| 5,514,402 A * | 5/1996 | Williams | A21B 3/13 | 426/496 |
| 5,609,903 A * | 3/1997 | Israel | A21C 3/08 | 264/103 |
| 6,058,843 A * | 5/2000 | Young | B41J 2/01 | 101/483 |
| 6,183,799 B1 * | 2/2001 | Wu | A23G 3/2007 | 426/516 |
| 6,286,708 B1 * | 9/2001 | Scheibmeir | A21B 3/13 | 220/573.1 |
| 6,479,087 B1 * | 11/2002 | Cole | A01J 25/008 | 426/283 |
| 6,558,721 B1 * | 5/2003 | Parsons | A21C 9/04 | 118/24 |
| 6,626,996 B1 * | 9/2003 | Amigh | A21C 9/04 | 118/13 |
| 7,036,427 B2 * | 5/2006 | Letendre | A21D 6/00 | 221/211 |
| 7,610,837 B2 * | 11/2009 | Craig | A21D 13/41 | 30/292 |
| 7,923,048 B2 * | 4/2011 | Graham | A21D 13/41 | 426/500 |
| 9,044,037 B2 * | 6/2015 | Ream | A23G 3/0021 | |
| 2002/0176921 A1 * | 11/2002 | Torghele | A21C 1/06 | 426/549 |
| 2004/0018291 A1 * | 1/2004 | Nelson | A21D 13/41 | 426/549 |
| 2005/0178277 A1 * | 8/2005 | Simonsen | A21C 9/04 | 99/494 |
| 2006/0240154 A1 * | 10/2006 | Craig | A21D 13/41 | 426/94 |
| 2007/0017383 A1 * | 1/2007 | Westberg | A21C 9/04 | 99/349 |
| 2007/0275143 A1 * | 11/2007 | Hoskins, IV | A21C 11/08 | 426/496 |
| 2008/0268120 A1 * | 10/2008 | Flambeau | A23G 3/0242 | 426/516 |
| 2011/0014311 A1 * | 1/2011 | Holmes | A01J 27/04 | 425/112 |
| 2011/0256280 A1 * | 10/2011 | Saad | A21C 9/06 | 426/283 |
| 2012/0185086 A1 * | 7/2012 | Khatchadourian | A21D 8/02 | 700/233 |
| 2014/0050825 A1 * | 2/2014 | van Blokland | A21C 9/04 | 426/231 |
| 2014/0242248 A1 * | 8/2014 | Zietlow | A23C 20/00 | 426/582 |
| 2015/0030741 A1 * | 1/2015 | Findlay | A21C 11/06 | 426/496 |
| 2015/0056336 A1 * | 2/2015 | Fahey-Burke | A21D 13/41 | 426/94 |
| 2015/0147435 A1 * | 5/2015 | Rettey | A21C 11/02 | 426/27 |
| 2018/0338504 A1 * | 11/2018 | Lavri | A21C 9/04 | |
| 2019/0191722 A1 * | 6/2019 | Sonnichsen | A21C 11/006 | |
| 2020/0060292 A1 * | 2/2020 | Lewis | A21C 3/02 | |
| 2020/0163347 A1 * | 5/2020 | Bechtold | A21D 13/06 | |

* cited by examiner

APPARATUS AND METHOD FOR A CONTINUOUS CHEESE ROPE DEPOSITOR

CROSS REFERENCE TO RELATED APPLICATIONS

Not Applicable.

STATEMENT REGARDING FEDERALLY SPONSORED RESEARCH OR DEVELOPMENT

Not Applicable

PARTIES TO A JOINT RESEARCH AGREEMENT

Not Applicable

FIELD OF THE INVENTION

This invention relates to a method and apparatus for making stuffed crust pizza on a mass production basis. The product comprises a circular disc of pizza dough and a ring of cheese which is positioned about the circumference of the pizza dough.

BACKGROUND OF THE INVENTION

This invention relates to a unique apparatus and method for producing stuffed crust pizza.

Presently, stuffed crust pizza is produced either by hand where an individual places a single long rope or multiple smaller segments of cheese onto pizza dough in the form of a circle or ellipse. The ellipse is generally required for sheeted dough. For large scale production, cheese in the form of blocks, chunks, cubes or shreds is loaded into a Vemag® vacuum filling machine. The machine pumps the cheese through a multi-port flow divider which divides the flow of cheese into multiple lanes which produce pizza across the several lanes at once. The pizza dough is fed on a conveyor belt where the cheese is deposited on the pizza through a set of movable nozzles forming a circular rope of cheese on the dough discs.

The drawback to these methods of applying the cheese is that they require the dough to be stopped on the conveyor to get an accurate circular shape. However, most pizza manufacturing lines in operation are continuous meaning the dough does not stop on a conveyor belt. The downside to stopping the crusts is the added cost of machinery needed to stop a continuous dough sheet and the reduction in throughput due to the time it takes to start and stop the dough sheet.

The prior art includes U.S. Pat. No. 6,479,087 to Cole, et al. The patent relates to a system for depositing cheese on a pizza crust and more particularly to a system for making stuffed crust pizza. Shreds of mozzarella cheese in bead form are deposited by nozzles on to the periphery of a crust for a pizza pie. The cheese is extruded through the nozzles by high speed extrusion apparatus. The extrusion apparatus includes an advancing mechanism which drives the mass of cheese for depositing onto the pizza crust. The system is mainly directed towards forming accurate shreds of mozzarella cheese into bead form and then depositing the bead on the periphery of a pizza crust. An important goal of the invention is to produce a cheese stuffed pizza rim using lower cost IQF shreds while achieving commercially satisfactory results in terms of the texture and stringiness of the cheese.

U.S. Pat. No. 4,902,523 to Fritchen, is directed to an apparatus and method for producing a cheese product. The apparatus includes an extrusion head having a plurality of extrusion apertures. Cheese is formed into a plurality of continuous ropes as the cheese passes through the extrusion apertures. The cheese rope exits the extrusion aperture on to a canal table that is downwardly sloped from the feed end to an opposite discharge end and includes a plurality of flumes. Sensors detect the position of the leading end of the cheese rope within each flume to cut the cheese in the desired length. The patent is not directed to producing pizza.

U.S. Pat. No. 4,759,704 to Kraus, is directed to a string cheese cutter which cuts string cheese at a precise length as the cheese is extruded.

U.S. Pat. No. 5,865,107 to Sangruneth, et al, is directed to an apparatus for making a stuffed crust pizza. The invention provides a method for making stuffed crust pizza in a pizza pan by applying a stuffing layer of an edible material over substantially an entire first pizza crust and then placing a second pizza crust over the layer of stuffing. The pizza pan is conveyed on a movable belt.

U.S. Pat. No. 3,908,584 to Raque, is directed to a pizza topping machine wherein the flowable topping is deposited in a circular pattern on to a series of pizza dough shells and wherein other topping materials are provided downstream at dispensing stations. The shells are on a conveyor which is momentarily halted under a hopper for tomato paste and then another hopper for toppings.

U.S. Pat. No. 4,392,801 to Meyer, is directed to an apparatus for manufacturing cheese product wherein the extrusion of a heated mass of cheese is followed by subsequent pulling or tensing of the extruded strand which develops a fibrous texture in the product and reduces the size of the strand. The extrusion of the heated mass of cheese is followed by subsequent tensing of the extruded strand.

SUMMARY OF INVENTION

This invention relates to method and apparatus for forming stuffed crust pizza on a continuous high speed basis. The invention can form and deposit a cheese rope in either an ellipse or circular shape onto a moving sheet of dough in multiple lanes using a waterwheel flow divider.

An encoder is mounted to the conveyor feeding the dough to the system. This encoder provides both position information and information on the speed of the dough to a motion controller which is then used to regulate the movement of the cheese depositing nozzles. A stamping device initially presses an indentation of the cheese shape into the dough sheet which provides a natural resting location for the cheese to be deposited. A set of nozzles is utilized to form the cross sectional shape of the cheese. Each nozzle forms one half of the total shape of the cheese and the flow to each nozzle is controlled by a waterwheel flow divider.

Accordingly, it is an object of this invention to provide a new and improved method and apparatus for producing stuffed crust pizza.

It is another object of this invention to provide a new and improved invention for producing stuffed crust pizza on a continuous mass production basis wherein a plurality of pizzas are fed on a multi-lane conveyor belt to provide the pizzas to cheese depositing nozzles.

It is a further object of this invention to provide a new and improved apparatus for producing stuffed crust pizza wherein two nozzles are provided for each lane of pizzas to be produced wherein each nozzle in its movement forms one half of the total shape for the cheese deposit.

A further object of this invention is to provide a unique method and apparatus wherein the cheese flow to each pair of nozzles is controlled by a waterwheel flow divider and an encoder is used to measure both position information and dough speed to regulate the movement of cheese depositing nozzles to form stuffed crust pizza.

A still further object of this invention is to provide a method and apparatus for controlling the cheese depositing nozzles by a mechanical linear guide system which permits the nozzles to move in two directions to form the elliptical or circular shape of the cheese deposit.

A more specific object of this invention is to provide a high production system for producing stuffed crust in three continuously moving lanes on a conveyor by forcing the cheese through a pair of nozzles for each lane onto the pizza dough with the nozzles mounted to a mechanical linear guide system which in combination with the conveyor movement and speed regulated by the encoder forms a circular or elliptical cheese pattern on the dough.

BRIEF DESCRIPTION OF DRAWINGS

The above and other objects of this invention may be more clearly seen when viewed in conjunction with the accompanying drawings wherein.

DETAILED DESCRIPTION OF THE INVENTION

Figure 1:
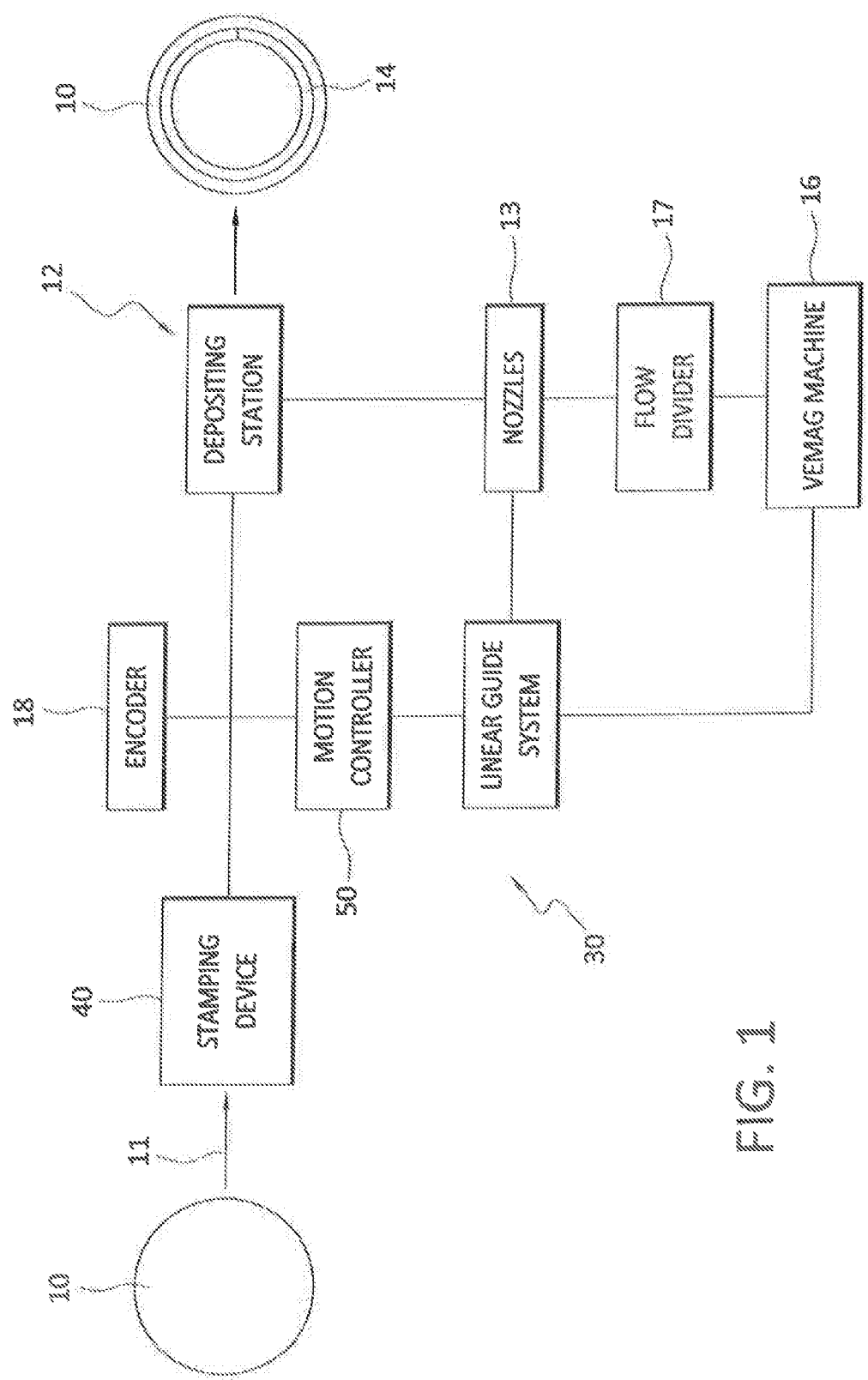
FIG. 1 is a block diagram illustrating the unique process of the invention in a pizza production line.
Figure 2:
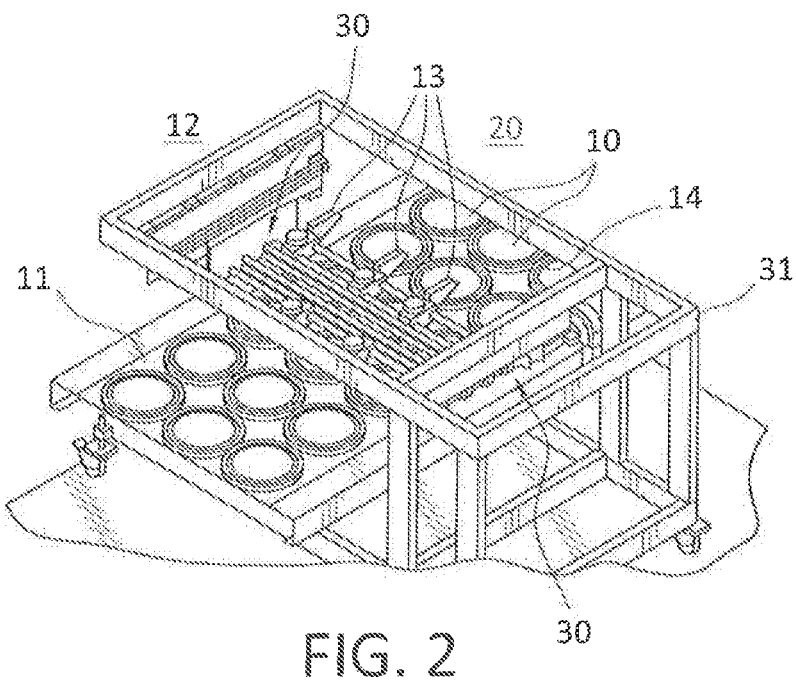
FIG. 2 is a perspective view of the cheese ring depositing system.

Referring to the drawings, the outline of the invention with the principal components is shown in FIG. 1. FIG. 2 shows three lanes of circular pizza dough 10 proceeding on a high speed conveyor 11 to a depositing station 12 where three sets of two paired nozzles 13 deposit cheese 14 in a circular or elliptical pattern on the dough 10. The process normally starts with a stamping device 40 which presses an indentation of the cheese shape into the dough sheet. This provides a natural resting position for the cheese to be placed and maintains the cheese shape in position.

The cheese 14 is initially fed into a Vemag® or other vacuum filling machine 16 in the form of blocks, chunks, cubes, or shreds. The machine 16 pumps the cheese 14 through a multi-port flow divider 17 which divides the flow of cheese 14 into multiple lanes. The cheese 14 then flows through sets of nozzles 13 which form the circular rope of cheese and deposit it onto the pizza dough disc 10. The connecting nozzles 13 or the pipework between the nozzles 13 and the Vemag® may be heated to improve the flow of cheese or to reduce pressure.

These continuous cheese rope depositors or nozzles 13 can form and deposit the cheese rope in either an ellipse or circular shape on a moving sheet of dough discs 10 in multiple lanes. The cheese 14 is fed from a Vemag® machine 16 in multiple lanes using a waterwheel flow divider 17 which directs the cheese 14 to paired sets of nozzles 16. The shape of the cheese rope is related to the moving sheet of dough on the conveyor 11 and the movement of the nozzles 13. An encoder 18 is mounted to the conveyor 11 to provide both position information and speed of the dough 10 to a motion controller 50 to regulate the movement of the nozzles 13 through the linear guide system 30.

Figure 3:
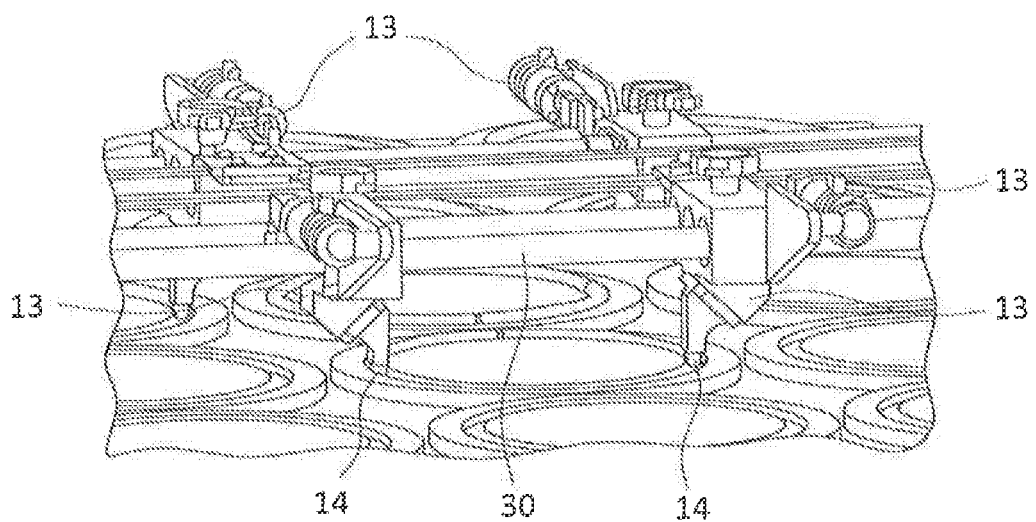
FIG. 3 is an enlarged perspective view of nozzles involved in cheese depositing; and, FIG. 4 is a plan view of a pizza line with the cheese depositing nozzles and the mechanical linear guide system.

The set 16 of nozzles 13 shown in FIG. 2 and FIG. 3 form the shape of the cheese deposit. The nozzles 13 are pointed downward towards the pizza crusts 10. A set of two nozzles 16 are required for each lane of pizzas to be produced and for a three lane system shown in the drawings, three sets 16 of two nozzles are required. Each nozzle 13 in a set forms one half of the total cheese shape and flow to each nozzle 13 is controlled by a waterwheel flow divider 18. In the embodiment shown in the drawings, approximately 100 stuffed crust pizzas can be produced per minute in a continuous operation.

As a further advantage of this unique cheese ring depositor, the device can be supported on a portable moveable frame 31 which can be positioned appropriately over the moving conveyor 11.

Figure 4:
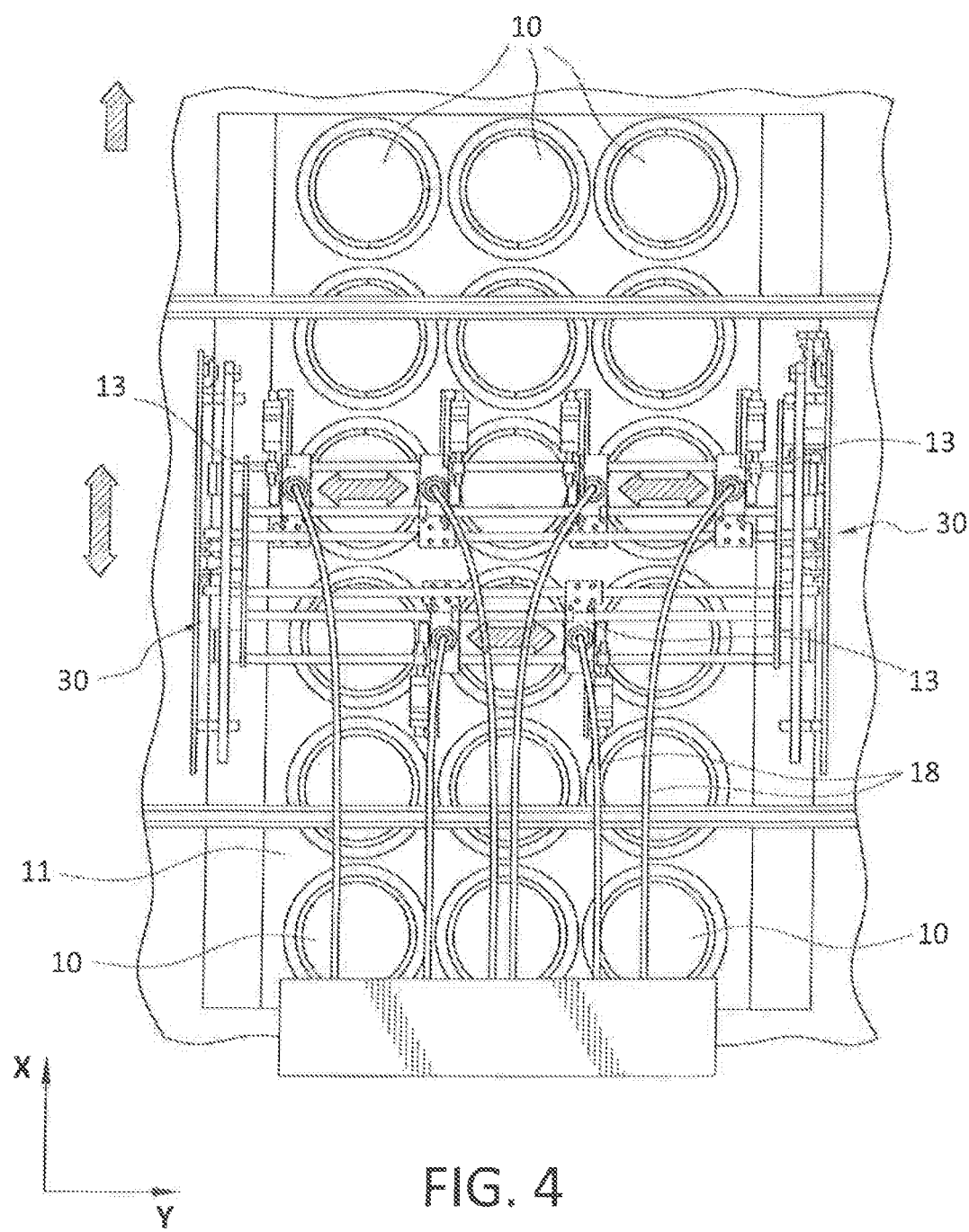

As shown more specifically in FIG. 4, the nozzles 13 are mounted to a mechanical linear guide system 30 that allows the nozzles 13 to move in two directions (x and y directions) to form the circular cheese bead 14 on a pizza disc 10. At the start of the cycle, as the dough sheet moves forward, a signal from the encoder 18 to a servomotor (not shown) via the motion controller 50 causes the nozzles 13 to move forward in the direction of the feed conveyor movement to match the speed of the dough 10. The servomotor then moves the nozzles 13 in each pair in opposite directions outward away from the center in the Y direction. This outward motion of the nozzles 13, combined with the forward movement of the dough 10 creates the desired circular shape of cheese 14 on the dough 10. This device 30 calculates the proper motion profile using the position and velocity data from the encoder 18. The encoder 18 is also used to determine when to start and stop the cheese flow from the Vemag® 16. Finally when the cheese shape on the dough 10 is complete, a small powered knife (not shown) separates the cheese portion on the nozzle 13. A powered shut-off valve not shown built into the nozzle assembly 13 prevents cheese 14 from oozing out of the nozzle 13 between deposits.

The process as described above involves sheeted dough continuously and rapidly moving on a feed conveyor 11. Firstly, a stamping device 40 stamps an imprint of the pizza disc 10 and of the cheese shape on the dough sheet. An encoder 18 mounted to the conveyor 11 provides both position and speed feedback to the linear guide system 30 controlling the cheese rope depositing nozzle 13. This information is used to calculate the nozzle position and speed of the cheese rope in both the X and Y directions and positions it in the imprint. The encoder information is also used to calculate and vary the filling machine speed to obtain a ring of consistent weight per unit length.

More specifically, at the start of the sequence, a servomotor (not shown) moves the nozzles 13 forward in the direction of the feed conveyor movement direction (X direction) to match the conveyor speed for the start of the cheese deposit. At the same time, the vacuum filling machine 16 pumps cheese 14 through the waterwheel flow divider 17 which supplies cheese via flexible hoses 18 to each of the paired nozzle assemblies 16. A servomotor moves the nozzle assemblies 16 outward and then inward in the Y direction. The move of the nozzles 13 combined with the movement of the conveyor 11 creates the cheese ring shape. When the pizza is formed, a signal from the encoder 18 closes the flow valves in the divider 17 and a cutting device separates the cheese portion from the stream of the cheese 14 from the nozzles 13. The nozzles 13 move back to the X and Y home positions to repeat the process.

While the invention has been explained by a detailed description of certain specific embodiments, it is understood that various modifications and substitutions can be made in any of them within the scope of the appended claims, which are intended also to include equivalents of such embodiments.

What is claimed is:

1. An apparatus for forming stuffed crust pizza on a continuously moving conveyor comprising:
   a belt conveyor;
   a plurality of pizza dough discs having a circumferential indentation positioned directly on said belt conveyor in a plurality of separate lanes, said belt conveyor moving at a speed of approximately 100 pizza dough discs per minute;
   a vacuum filling machine for extruding cheese;
   a flow divider connected to and directing the cheese flow from the vacuum filling machine to the plurality of separate lanes; and,
   a depositing station having nozzles coupled to the flow divider and positioned over the belt conveyor for precisely depositing the cheese from the plurality of separate lanes in the flow divider onto the moving pizza dough discs in a predetermined pattern filling the circumferential indentation by moving the nozzles in the direction of the belt conveyor and in a transverse direction to the direction of the belt conveyor.

2. An apparatus for forming stuffed crust pizza in accordance with claim 1 wherein:
   the depositing station includes a pair of nozzles in each separate lane for depositing cheese onto the circumferential indentation in each pizza dough disc.

3. An apparatus for forming stuffed crust pizza in accordance with claim 2 wherein the depositing station further includes:
   a linear guide system connected to the nozzles to provide a two dimensional movement to the nozzles which with the movement of the belt conveyor provides a circular or elliptical ring shaped cheese pattern about the dough discs.

4. An apparatus for forming stuffed crust pizza in accordance with claim 2 further including:
   an encoder mounted to the belt conveyor to provide position information and speed of the pizza dough discs on the belt conveyor to regulate the movement of the nozzles depositing cheese in the circumferential disc indentation.

5. An apparatus for forming stuffed crust pizza in accordance with claim 4 wherein:
   said linear guide system is controlled by the encoder to move said nozzles forward to match the speed of the dough and then outward to form a circular cheese pattern on the dough indentation.

6. An apparatus for forming stuffed crust pizza in accordance with claim 1 wherein:
   the plurality of pizza dough discs are positioned in three separate lanes on the belt conveyor; and, including
   a pair of nozzles for each lane to deposit cheese in a predetermined ring shaped pattern on the pizza dough.

7. A method for providing stuffed crust pizza on a continuously moving belt conveyor comprising the steps of:
   feeding a plurality of pizza dough discs each having a circumferential indentation in an array comprising a plurality of discs arranged in a predetermined number of adjacent lanes on the belt conveyor at approximately 100 discs per minute;
   providing a pair of nozzles for each disc in each lane;
   providing a vacuum filling machine to feed cheese to the nozzles;
   depositing cheese from the vacuum filling machine on the indentations in the pizza discs in a peripheral circular pattern with the nozzles in each pair moving in the direction of the belt conveyor and moving the nozzles in a transverse direction to deposit cheese and complete a ring like circular cheese pattern about the disc;
   providing an encoder to control the flow of cheese to the pizza discs through the nozzles in accordance with the belt conveyor speed by supplying a signal; and
   providing a motion controller to receive the encoder signal to determine movement profiles and regulate the vacuum filling machine pumping speed.

8. A method for providing stuffed crust pizza in accordance with claim 7, further including the steps of:
   determining both position and speed of the pizza dough discs on the belt conveyor;
   calculating the nozzle speed and position to form a cheese deposit on the pizza disc and position said cheese deposit in the indentation; and
   varying the filling machine speed to provide a cheese deposit of consistent weight per unit length.

9. A method for providing stuffed crust pizza in accordance with claim 8 further including:
   providing a water wheel flow divider;
   pumping cheese from the filling machine through the flow divider to the nozzles;
   shutting off the flow divider when a disc is complete with cheese around the indentation; and,
   separating the cheese flow from the nozzles when the pizza disc is complete with cheese around the indentation.

* * * * *